United States Patent [19]
Burrough et al.

[11] 3,721,079
[45] March 20, 1973

[54] MOWING APPARATUS

[75] Inventors: Donald E. Burrough, West Bend, Wis.; Wilfred Lee Roy Steuerwald; Bobby Gene Sawyer, both of Ottumwa, Iowa

[73] Assignee: Deere & Company, Moline, Ill.

[22] Filed: Aug. 12, 1971

[21] Appl. No.: 171,192

[52] U.S. Cl..................................56/305, 56/308
[51] Int. Cl. ............................................A01d 55/08
[58] Field of Search...................56/298,305,307–311

[56] References Cited

UNITED STATES PATENTS

| | | | |
|---|---|---|---|
| 1,133,219 | 3/1915 | Benoit | 56/311 |
| 1,793,717 | 2/1931 | Pearson | 56/311 |
| 3,098,338 | 7/1963 | Myers | 56/307 X |
| 1,196,239 | 8/1916 | Hotchkiss | 56/305 |

FOREIGN PATENTS OR APPLICATIONS

| | | | |
|---|---|---|---|
| 67,047 | 5/1914 | Austria | 56/305 |
| 603,768 | 9/1934 | Germany | 56/305 |

Primary Examiner—Louis G. Mancene
Assistant Examiner—J. A. Oliff
Attorney—H. Vincent Harsha et al.

[57] ABSTRACT

Mowing apparatus of the reciprocating sickle type including an elongated support beam, a sickle guard mounted on the beam and extending forwardly therefrom, and a sickle bar having a plurality of sharpened knife sections reciprocable through a horizontal slot formed in the guard. The guard includes a lip portion and a body portion, the former overlapping the longitudinal sides of the latter and being spaced vertically therefrom to form the horizontal slot in the guard. Material being mowed is thus inclined transversely outwardly from the sides of the guard and assists in maintaining the sickle in proper cutting relation therewith. The sickle is further maintained in position by means of a circular plate member mounted on the support beam directly behind the lip portion of the guard and overlying the rear edge portion of the sickle.

10 Claims, 3 Drawing Figures

3,721,079

INVENTORS
D. E. BURROUGH
W. L. STEUERWALD
B. G. SAWYER

BY

John O. Hayes
ATTORNEY

MOWING APPARATUS

BACKGROUND OF THE INVENTION

The present invention relates generally to mowing apparatus of the reciprocating sickle type, and more particularly to means for maintaining the sickle bar of such apparatus in proper cutting relation with the sickle guard member.

The sickle bar of such conventional mowing apparatus comprises a plurality of knife sections riveted to an elongated bar, the sections having a pair of sharpened cutting edges converging forwardly from the bar and a transverse rear edge portion overlapping the rear of the bar. As the section reciprocates through a slot formed in its associated guard member, the sharpened edges thereof cooperate with the longitudinal edges of the ledger surface of the guard to cut standing crop as the apparatus is advanced forwardly. Since the cutting action between the knife and the ledger surface is of the shear, as opposed to the impact-type, a close register must be maintained between the two elements to obtain proper cutting performance.

When operating in thick, leafy, or damp material, the resistance of the material being cut tends to force the reciprocating knife of conventional mowing apparatus up and out of proper register with the guard edges. To counteract this tendency, such apparatus is conventionally provided with a series of hold-down clips placed along the mower support beam and engageable with the sickle to prevent the latter from moving out of proper register with the guard. Such hold-down clips, in their most common form, comprise a first, transversely elongated portion extending along the support beam between a pair of adjacent guards, and a second portion extending forwardly from the center of the transverse portion, the second portion arching upwardly over the heads of the rivets securing the knife sections to the cutterbar and terminating at its forward end in a horizontal bearing portion in close proximity to the upper surface of the knife sections. A somewhat modified form of the conventional hold-down clip, illustrated in U.S. Pat. No. 2,203,982, further includes portions on the ends of the transverse portion extending forwardly in overlying relation to the transverse rear edge of the sickle.

For several reasons, hold-down clips of the conventional type have not been entirely satisfactory. To perform satisfactorily, the position of the horizontal bearing surface on the forward end of the clip must be adjusted so that it just clears the surface of the knife. Excessive clearance between the clip and knife permits the latter to rise away from the guard ledger surface, and thus greatly reduces the efficiency of the apparatus. Too little, or negative, clearance between these elements, on the other hand, imposes a drag on the sickle bar and causes rapid wear of both the knife section and clip. Adjustment of the clip is accomplished by bending the forwardly extending portion either up or down, as required. This adjustment process is somewhat tedious and can normally be effected only after the sickle has been removed.

A further problem associated with conventional hold-down clips, when operating in certain crop conditions, is that of material building up on the clips and eventually forcing a stop to the mowing operation. There are two primary causes of this problem, one being the location of the clip in the area between adjacent guards. As the mowing apparatus advances forwardly, the crop is divided by the series of pointed guards and deflected into the areas between adjacent guards. When the crop is then cut, the cut portion passes over the top of the mower support beam and falls back to the ground. Since the clip is situated in this area of concentrated crop flow, the crop has a tendency to catch and build up on the clip. The second and perhaps primary cause of the problem is the configuration of the forwardly extending portion of the clip. As previously noted, this portion is arched upwardly to clear the rivets securing the knife sections to the cutterbar. This arched portion forms a trap or snag for the cut material, and as the crop builds up thereon, the trap is made larger and the problem thus more acute.

SUMMARY OF THE INVENTION

Accordingly, the primary object of the present invention is to provide mowing apparatus having improved means for maintaining the sickle in proper cutting relation with the guard ledger surface. More particularly, it is an object to provide improved sickle hold-down means which eliminates the problem of material retention associated with hold-down clips of conventional construction. It is a further object to provide such hold-down means characterized by its ease of adjustment. It is yet a further object to provide such hold-down means having a simple and economical construction.

The invention comprises, generally, a guard having a lip portion that overhangs the longitudinal cutting edges of the guard ledger surface, in combination with structure mounted on the mower support beam and extending forwardly in overlying relation with the transverse rear edge of the sickle. Providing the guard lip with a transverse dimension greater than that of the guard ledger surface is, by itself, old in the mower art, as illustrated by U.S. Pat. No. 1,133,219, issued Mar. 23, 1915 to Benoit. Applicants have discovered, however, that when the guard is so contructed, the crop material being mowed is inclined transversely outwardly from the sides of the guard as the knife advances into the slot formed beneath the lip; that this disposition of the crop tends to hold the front portion of the knife down against the ledger surface of the guard; and that only the transverse rear edge of the knife need be restrained from vertical movement.

According to the invention, the rear edge of the knife is held down by means of a circular plate mounted directly behind the guard lip and overlying the edge of the knife. Since only the extreme rear edge of the knife need be held down, as a consequence of the guard configuration which acts as a hold-down for the front portion thereof, the hold-down can be placed directly behind the guard lip without interfering therewith. As noted previously, the bulk of the cut crop passes over the mower support beam in the area between adjacent guards, and thus very little material enters the area directly behind the guard lip. By placing the hold-down in this area, the possibility of crop material snagging thereof is greatly reduced. The rounded, leading edge of the hold-down member also helps to prevent material from catching thereon. Further contributing to the improved operation of the hold-down means of the apparatus is the fact that, since only the rear edge portion of the knife, rearwardly of the rivets securing the knife sections to the sickle bar, need be restrained from vertical movement, the holddown means need not include the conventional arched portion extending over the rivets. Thus, a primary cause of the material retention problem associated with mowing apparatus of conventional design is eliminated.

Proper adjustment of the hold-down apparatus of the invention is much less critical than is the case with conventional hold-down apparatus, since the function of maintaining the knife in proper cutting relation with the guard is primarily assumed by the configuration of the guard lip. An amount of clearance between the hold-down and the sickle sufficient only to retain the latter in its general operating position is required, hence the clearance can be set within a relatively wide range for satisfactory operation. According to the invention, the optimum clearance is established initially and should need adjustment only as a result of wear occurring on the underneath surface of the hold-down member. When the clearance becomes excessive due to such wear, it is a relatively simple matter to loosen the bolt holding the circular plate, turn the plate until a different chordal portion thereof overlies the rear edge of the knife, and retighten the bolt. It will be apparent that this adjustment can be performed without removing the sickle from the apparatus.

The apparatus employed to retain the rear edge of the knife in position is extremely economical and simple to construct, since a conventional flat washer can be used as the hold-down member, and the bolt which mounts the guard on the mower support beam can also be used to mount the washer thereon. In addition, the circular configuration of the member eliminates any problems of correctly positioning the member during assembly.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
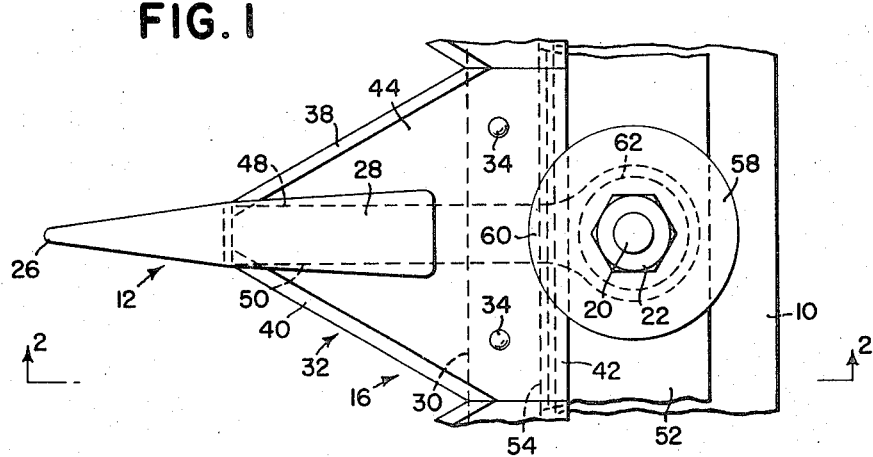
FIG. 1 is a fragmentary top view of mowing apparatus constructed in accordance with the principles of the invention.

The mowing apparatus includes a transversely elongated support beam member 10, only a small portion of which is shown in FIG. 1. A plurality of sickle guard members 12, only one being shown in the drawings, are mounted at equally-spaced points on the beam 10 and extend forwardly therefrom. The guards are slotted at 14 to receive a transversely elongated sickle, indicated generally by the numeral 16.

The rear or heel portion 18 of the guard 12 is secured to the underneath side of the beam 10 by means of a bolt 20 and nut 22, the bolt extending vertically through the portion 18 and beam 10 and threadably receiving the nut 22 on its upper end. The main body portion 24 of the guard 12 is integrally joined with the heel portion 18 and tapers forwardly to a point at 26. Extending rearwardly from the point 26 and spaced vertically from the main body portion 24 is a lip portion 28, the opposed surfaces of the lip 28 and body portion 24 forming the slot 14 for receiving the sickle 16.

Figure 2:
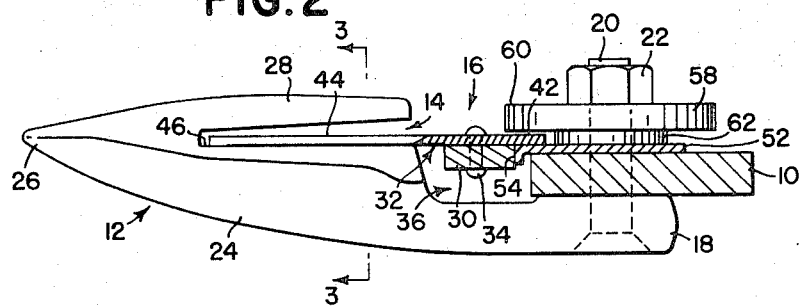
FIG. 2 is a sectional view taken along the line 2—2 of FIG. 1.

The sickle 16 comprises a support bar 30 extending transversely along the front side of the beam 10, and a plurality of six-sided knife sections 32 secured to the upper side thereof by means of two transversely aligned rivets 34. As shown in FIG. 2, a transverse groove or recess 36 is formed in the body portion 24 of the guard to receive the bar 30. Each of the knife sections 32 includes a pair of right and left, forwardly converging sharpened edges 38 and 40, respectively, and a transverse rear edge portion 42. During operation of the apparatus the bar 30, and thus the knife sections 32, are reciprocated transversely by any conventional drive means. The forward portion 44 of the knife section 32 slides on the lower or ledger surface 46 of the slot 14, and the edges 38 and 40 thereof pass across sharpened longitudinal edges 48 and 50 of the surface 46 to cut standing crop. The rear edge portion 42 of the section 32 is supported on a replaceable wear plate 52, the plate 52 lying on and extending forwardly from the upper surface of the beam 10. The nut and bolt, 22 and 20, secure the plate 52 to the beam. A down-turned forward edge portion 54 of the plate 52 engages the rear surface of the bar 30 to limit rearward movement of the sickle 16.

Figure 3:
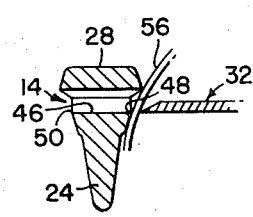
FIG. 3 is a sectional view taken along the line 3—3 of FIG. 2 and illustrating the inclination of the material being mowed as the sickle knife approaches the guard cutting edge.

Referring now to FIG. 3, it will be seen that the lip portion 28 of the guard is wider than, and transversely overlaps, the longitudinal sides of the main body portion 24. As a result, the standing crop, as indicated at 56, is inclined transversely outwardly from the side of the guard as the knife 32 enters the slot 14. This inclination of the crop 56 tends to force the knife 32 down against the ledger surface 46, and thus acts to maintain the knife 32 and surface 46 in proper cutting relation. By way of contrast, in conventional guard construction the lip is of an equal or lesser width than the ledger surface, the crop is thus either vertical or inclined inwardly as the knife approaches the edge of the guard, and the crop tends to force the knife upwardly and out of proper register with the guard.

Applicants have discovered that the vertical force imposed by the crop 56 on the knife 32 is normally sufficient to maintain the front portion 44 of the knife down against the ledger surface 46, and it is thus necessary to provide separate hold-down apparatus only for the rear transverse edge portion 42 of the knife. According to the invention, such apparatus is provided in the form of a circular flat plate member 58 mounted on the support beam 10 substantially on the longitudinal centerline of the guard 12 and directly behind the lip portion 28 thereof. A forward chordal portion 60 of the member 58 extends forwardly in overlying relation with the rear edge portion 42 of the knife 32. A circular spacer member 62 is interposed between the member 58 and wear plate 52 and is of the required thickness to maintain the desired clearance between the lower surface of the member 58 and the knife 32. The bolt 20 extends vertically through the members 58 and 62 and the outer circular edges of the members are formed about the vertical axis thereof.

The clearance between the member 58 and knife 32, provided by the spacer 62, need be adjusted only when wear of the underside of the member 58 becomes excessive. In that event, the proper clearance is renewed merely by loosening the nut 22, turning the member 58 until a different chordal portion thereof overlies the rear edge portion 42 of the knife, and retightening the nut 22. Since the member 58 is symmetrical about a horizontal plane, it may be turned upside down when one entire side thereof becomes excessively worn.

We claim:

1. Mowing apparatus comprising a substantially horizontal, transversely elongated support; at least one sickle guard mounted on and extending forwardly from said support, said guard having a body portion and a lip portion, the lip portion being spaced vertically from the body portion to form a substantially horizontal slot in said guard; releasable fastener means extending vertically through the rear portion of said guard substantially on the longitudinal centerline thereof and through said support for rigidly mounting said guard on said support; a transversely elongated sickle extending along said support, the forward portion of said sickle being reciprocable transversely through the horizontal slot in said guard and the rear portion thereof forming a substantially continuous transverse edge; and means for retaining said sickle in proper cutting relation with said guard comprising: a substantially circular plate member mounted on said support and having a substantially flat, horizontal lower surface portion, a forward chordal portion of which overlies the transverse rear edge portion of said sickle in close proximity thereto, said fastener means extending through and rigidly fixing said member to said support, the substantially circular outer edge of said member being formed about the vertical axis of said fastener means, and said member being rotatable about said vertical axis when the fastener means is released for positioning different chordal portions of said member in overlying relation with said sickle.

2. The invention defined in claim 1 wherein the lip portion of said guard has a greater transverse dimension and extends transversely outwardly of the longitudinal sides of the body portion of said guard, whereby material being mowed is inclined transversely outwardly from the sides of said guard and coaction between said inclined material and the forward portion of said sickle assists in maintaining the latter in proper cutting relation with said guard.

3. The invention defined in claim 1 including a spacer interposed between said support and said plate member, said spacer having an arcuate forward edge disposed in close proximity to the rear transverse edge of said sickle.

4. The invention defined in claim 3 wherein said spacer comprises a second, substantially circular plate member having a substantially flat, horizontal upper surface in surface contact with the lower surface of said first plate member, and wherein said fastener means extends through said second plate member, the substantially circular outer edge of said second plate member being formed about the vertical axis of said fastener means.

5. The invention defined in claim 1 wherein said circular plate member is substantially symmetrical about a horizontal plane.

6. Mowing apparatus comprising a substantially horizontal, transversely elongated support; at least one sickle guard mounted on and extending forwardly from said support, said guard having a body portion and a lip portion, the lip portion being spaced vertically from the body portion to form a substantially horizontal slot in said guard; releasable fastener means extending vertically through the rear portion of said guard substantially on the longitudinal centerline thereof and through said support for rigidly mounting said guard on said support; a transversely elongated sickle extending along said support and including a transversely elongated bar received within a transverse recess formed in said guard forwardly of said support, and at least one knife section connected to said bar by at least one fastener having a head portion extending above the upper surface of said knife section, said section including a cutting portion forwardly of said fastener means that is reciprocable transversely through the slot in said guard, and a rear edge portion rearwardly of said fastener that terminates rearwardly in a transverse edge; and means for retaining said sickle in proper cutting relation with said guard comprising: a member mounted on said support and including a first portion extending forwardly in overlying relation with the rear edge portion of said knife section, said releasable fastener means extending through and rigidly fixing said member to said support, said member being rotatable about the vertical axis of said fastener means when said fastener means is released, for positioning a second portion of said member in overlying relation with the rear edge portion of said knife section.

7. The invention defined in claim 6 wherein each of the first and second portions of said member, when positioned in overlying relation with the rear edge portion of said knife section, include a forward edge diverging rearwardly from a point on the longitudinal centerline of said guard.

8. Mowing apparatus comprising a substantially horizontal, transversely elongated support; a plurality of transversely spaced sickle guards mounted on and extending forwardly from said support, each guard having a body portion and a lip portion, the lip portion being spaced vertically from the body portion to form a substantially horizontal slot in said guard; releasable fastener means extending vertically through the rear portion of each guard substantially on the longitudinal centerline thereof and through said support for rigidly mounting the respective guard on said support; a transversely elongated sickle extending along said support, the forward portion of said sickle being reciprocable transversely through the horizontal slots in said guards and the rear portion thereof forming a substantially continuous transverse edge; and means for retaining said sickle in proper cutting relation with said guard comprising: circular plate members mounted on said support rearwardly of the transverse edge and in fore- and-aft alignment with the respective guards and including upper parts with substantially flat, horizontal lower surfaces with forward chordal portions which overlie the transverse rear edge portion of said sickle in close proximity thereto and lower parts that are offset rearwardly of the edge and retain a vertical gap between the support and lower surfaces to permit free reciprocating movement of the sickle, said fastener means extending through and rigidly fixing said members to said support, the substantially circular outer edge of said members being formed about the vertical axes of the respective fastener means, and said members being rotatable about said vertical axes when the fastener means is released for positioning different chordal portions of said members in overlying relation with said sickle.

9. Mowing apparatus comprising: a substantially horizontal, transversely elongated support; at least one sickle guard mounted on and extending forwardly from said support, said guard having a body portion and a lip portion, the lip portion being spaced vertically from the body portion to form a substantially horizontal slot in said guard; releasable fastener means extending vertically through the rear portion of said guard substantially on the longitudinal centerline thereof and through said support for rigidly mounting said guard on said support; a transversely elongated sickle extending along said support, the forward portion of said sickle being reciprocable transversely through the horizontal slot in said guard and the rear portion thereof forming a substantially continuous transverse edge; and means for retaining said sickle in proper cutting relation with said guard comprising: a member mounted on said support and including a first portion extending forwardly in overlying relation with the rear portion of said sickle, said releasable fastener means extending through and rigidly fixing said member to said support, said member being rotatable about the vertical axis of said fastener means when said fastener means is released for positioning a second portion of said member in overlying relation with the rear portion of said sickle.

10. Mowing apparatus comprising a substantially horizontal, transversely elongated support; at least one sickle guard mounted on and extending forwardly from said support, said guard having a body portion and a lip portion, the lip portion being spaced vertically from the body portion to form a substantially horizontal slot in said guard; releasable fastener means extending vertically through the rear portion of said guard and through said support for rigidly mounting said guard on said support; a transversely elongated sickle extending along said support, the forward portion of said sickle being reciprocable transversely through the horizontal slot in said guard and the rear portion thereof forming a transverse edge; and means for retaining said sickle in proper cutting relation with said guard comprising: a substantially circular plate member mounted on said support with a forward chordal portion thereof overlying the rear edge portion of said sickle in close proximity thereto, said fastener means extending through and rigidly fixing said member to said support, the substantially circular outer edge of said member being formed about the vertical axis of said fastener means, and said member being rotatable about said vertical axis when the fastener means is released for positioning different chordal portions of said member in overlying relation with said sickle.

* * * * *